Aug. 5, 1952 G. C. SZIKLAI 2,606,246

COLOR TELEVISION SYSTEM

Filed Nov. 28, 1947 3 Sheets-Sheet 1

Inventor:
George C. Sziklai
By [signature]
ATTORNEY

Inventor
George C. Sziklai
By Otis A. Mitchell
Attorney

Aug. 5, 1952 G. C. SZIKLAI 2,606,246

COLOR TELEVISION SYSTEM

Filed Nov. 28, 1947 3 Sheets-Sheet 3

Inventor:
George C. Sziklai
By [signature]
Attorney

Patented Aug. 5, 1952

2,606,246

UNITED STATES PATENT OFFICE 2,606,246

COLOR TELEVISION SYSTEM

George C. Sziklai, Princeton, N. J., assignor to Radio Corporation of America, a corporation of Delaware Application November 28, 1947, Serial No. 788,747

19 Claims. (Cl. 178—5.4)

This invention relates to image reproducing systems and more particularly to reproduction in a simultaneous manner of a plurality of component color images in registry to produce a composite color image.

The invention will be illustrated for tricolor television, but is equally applicable to bicolor, quadricolor, tricolor plus neutral-color key plate, or any other similar form of multicolor additive television.

As is well known in the television art, the transmission of visual information over electrical circuits, such as a radio circuit, can be accomplished by analyzing the image into its image elements and deriving therefrom a signal train of impulses by an orderly sequence of scanning. The images may then be reproduced from the electrical signal train by reconstruction in the same orderly sequence of scanning.

The transmission of images in substantially their natural color can be accomplished by the simultaneous transmission through three separate and spaced signal channels of simultaneous energy representative of three selected color components or primaries of the object being scanned.

For the purpose of reference herein, the three selected primaries or color components will be mentioned as red, green and blue, although any suitable three colors may be selected with the condition being that all are to add to produce white, and that no two shall add to produce a third pure color. The selection of the component colors is preferred where the greatest portion of the I. C. I. color triangle is usable.

There is, however, one important difficulty in the simultaneous reproduction of color component images. It will be remembered that in an additive process of color reproduction, it is essential that the several component color images must be in substantially perfect registry to produce desirable results without serious degradation of image detail.

When three separate physical devices are employed for the reproduction of color images, one for each of the component colors, there may be involved difficulties in making optical, electrical and mechanical alignment which will preclude the convenient adjustment for proper registration of the several component color images.

According to this invention, an arrangement of image reproduction is suggested which alleviates the necessity for careful or repeated adjustment of individual color image registry. An image reproducing tube is provided wherein the several component color images are projected in registry on a single screen of the image producing tube.

In view of the fact that many black and white television receivers have been manufactured and distributed, it is important that consideration be given to color television systems which lend themselves to the employment of the popular black and white type television receivers with little or no modification. According to this invention, a popular black and white television receiver may be converted into a color television receiver very easily by the addition of a conversion unit.

A primary object of this invention is, therefore, to provide an improved television system.

Another object of the invention is to provide for all-electronic color image reproduction in a simultaneous type manner.

Still another object of this invention is to provide for simultaneous color image reproduction which is substantially free from registration difficulties.

Other and incidental objects of the invention will be apparent to those skilled in the art from a reading of the following specification and an inspection of the accompanying drawing in which.

Figure 6:
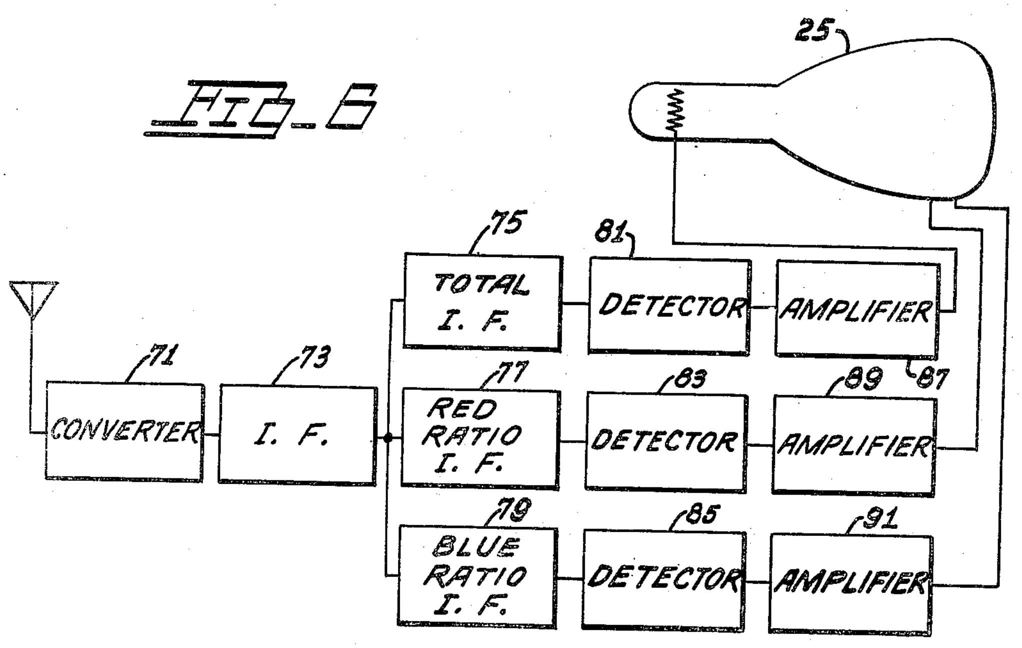
Figure 7:
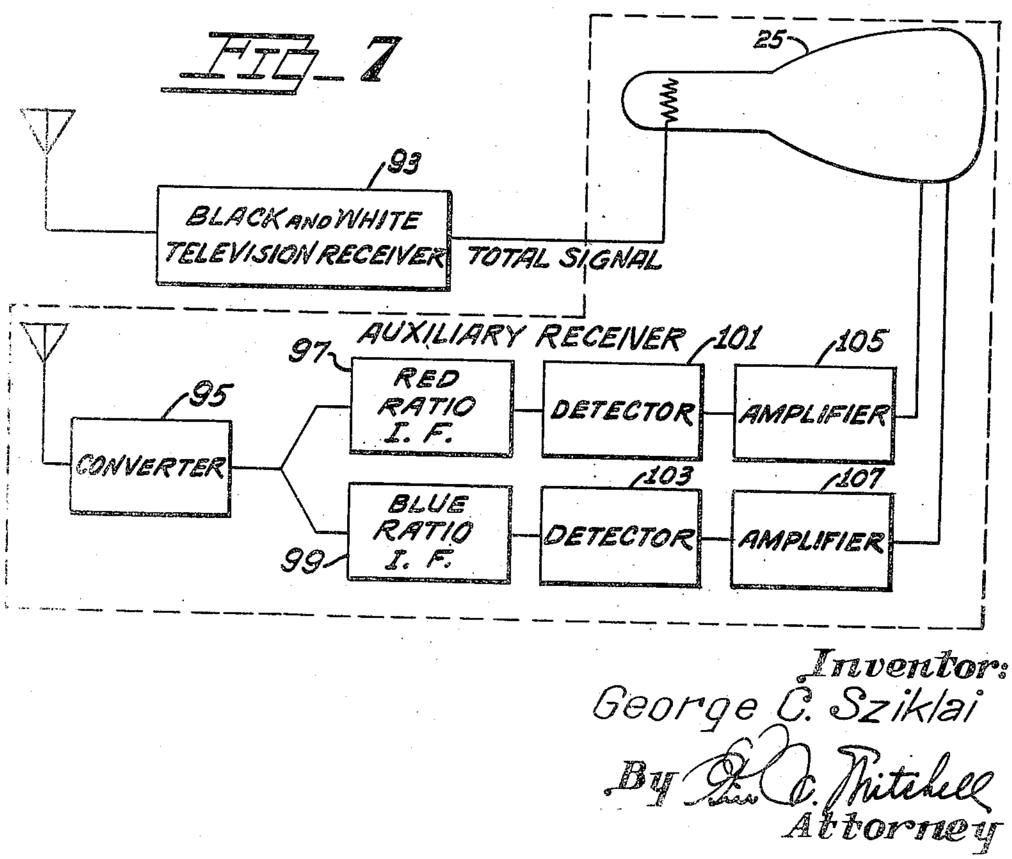

Figure 6 shows by block diagram another form of this invention suitable for reception of ratio type signals generated, for example, by a transmitter of the type shown and described in my copending U. S. Application, Serial No. 788,746, filed November 28, 1947, now Patent No. 2,566,707, granted September 4, 1951 and titled "Color Television System"; and Figure 7 shows also by block diagram still another form of this invention which may involve the presently marketed black and white television receiver, together with a converter unit involving a circuit arrangement and special color kinescope.

Transmitters for producing color television signals by scanning images and objects in the simultaneous type manner are well known to the art and may, for example, comprise separate scanning devices, one for each selected component color, the component color images being scanned simultaneously to produce the simultaneous type color television signals. One suitable form of color television transmitter is well shown and described in the articles relating to "Color Television," beginning on page 861 of the "Proceedings of the Institute of Radio Engineers" for September 1947.

Figure 1:
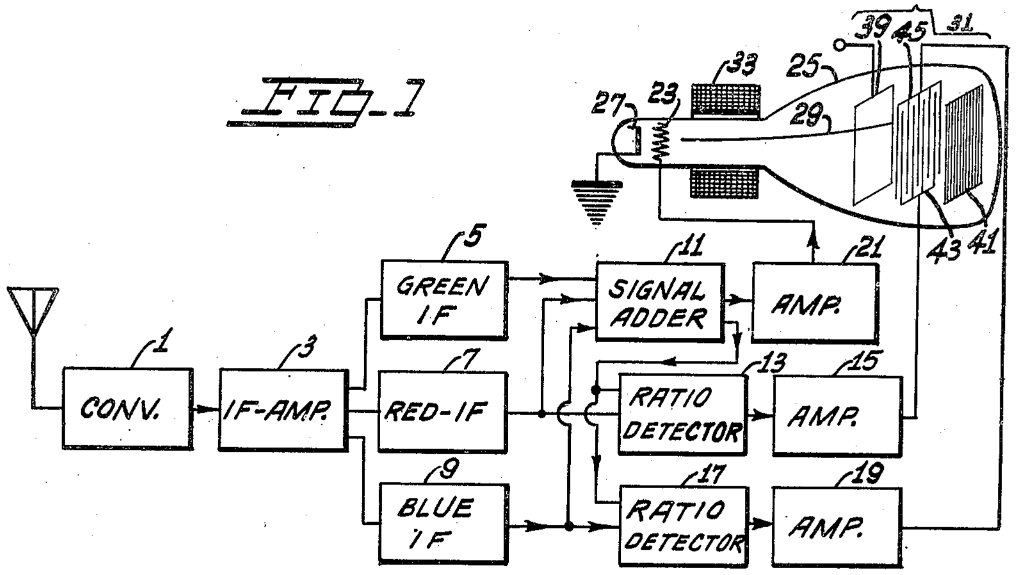
Figure 1 shows by block diagram one form of this invention.

Turning now in more detail to Figure 1, there is shown a television converter 1, together with an associated intermediate frequency amplifier 3 which may take any of the well known forms suitable for the reception of color television signals.

A suitable arrangement for the production of separate intermediate frequency signal channels of blue, red and green component representative signals, including the converter 1, the intermediate frequency amplifier 3, the green channel intermediate frequency amplifier 5, the red channel intermediate frequency amplifier 7, and the blue channel intermediate frequency amplifier 9, is shown and described in my co-pending U. S. application entitled "Signal Separator," Serial No. 760,400, filed July 11, 1947. In my co-pending application referred to, efficient amplification of independent signal trains representing selected component colors of a composite image is accomplished by amplifying the combined signal trains to a predetermined level before separation, and then amplifying the separated signal trains independently of one another.

Signal energy from each of the green, red and blue channel intermediate frequency amplifiers 5, 7 and 9 is transmitted to the signal adder 11 to be added or combined into a single signal train. A suitable signal adder 11 will be described below and is shown in detail by circuit diagram in Figure 5 of the drawing. Any arrangement for adding or combining the several signal trains is suitable for employment in the practice of this invention.

A ratio detector 13 is connected to receive signals from signal adder 11 and red intermediate frequency amplifier 7. Ratio detector 13 determines electrically the instantaneous ratio between the red and the total signals, and furnishes amplifier 15 a train of ratio signals equivalent to the ratio of the red components to the total.

A suitable ratio detector is shown in detail by circuit diagram in Figure 4, and will be described below. Any other ratio detector is suitable for employment in the practice of this invention. Another type signal ratio detector is shown and described in detail in my co-pending U. S. application, Serial No. 788,746, filed November 28, 1947, now Patent No. 2,567,707.

Ratio detector 17 is connected to receive signals from signal adder 11 and blue intermediate frequency amplifier 9 to determine the ratio therebetween, and transmits the ratio in the form of a ratio signal train to amplifier 19.

Although the form of the invention shown in Figure 1 is arranged to determine for one ratio signal train, the energy ratio between the blue and all the components and a second ratio between the red and all the components, according to another form of this invention one ratio may be determined between the blue and the red components, while another ratio may be determined between the blue and the green components. In still another form of this invention, ratios may be determined between the red and green components, while another ratio is determined between the blue and the green components. In still another form of this invention, ratios may be determined between the red and green components, while another ratio is determined between the blue and the green components.

The signal from the signal adder 11 is detected and it is transmitted to the amplifier 21, which is connected to the beam intensity control electrode 23 of image reproducing tube 25.

Image reproducing tube 25 contains an electron beam generation arrangement not unlike the common cathode ray tubes.

The cathode ray gun structure 27 develops a beam of electrons 29 shown in a conventional manner.

The gun 27 is provided with a control electrode or a grid 23 for modulating or controlling the intensity of the beam 29, which is focused within the depth or thickness of the target. A horizontal and vertical deflecting coil yoke assembly is indicated by reference character 33, and the horizontal and vertical deflecting coil assemblies therein are connected to horizontal and vertical deflection generators in the usual manner, and for the purpose of simplification of the drawing, details regarding the horizontal and vertical deflection generators are omitted therefrom.

The deflection and control circuits suitable for employment in the practice of this invention are well shown and described in the U. S. patent to Tolson et al., No. 2,101,520, dated December 17, 1937, or in the U. S. patent to Vance, No. 2,137,039, dated November 15, 1938.

Various electrodes of the electron gun 27 are not shown in detail in the drawing and are to be supplied, as usual, with suitable operating potentials. This may be accomplished as taught in the television art.

In accordance with the invention, the velocity or the direction of the beam 29 is altered by electrodes 43 and 45 connected to amplifiers 15 and 19, respectively.

In order to maintain constant velocity of the electron beam 29 through the deflection arrangement, an electrode 39 is provided and supplied with a constant positive potential.

Figure 2:
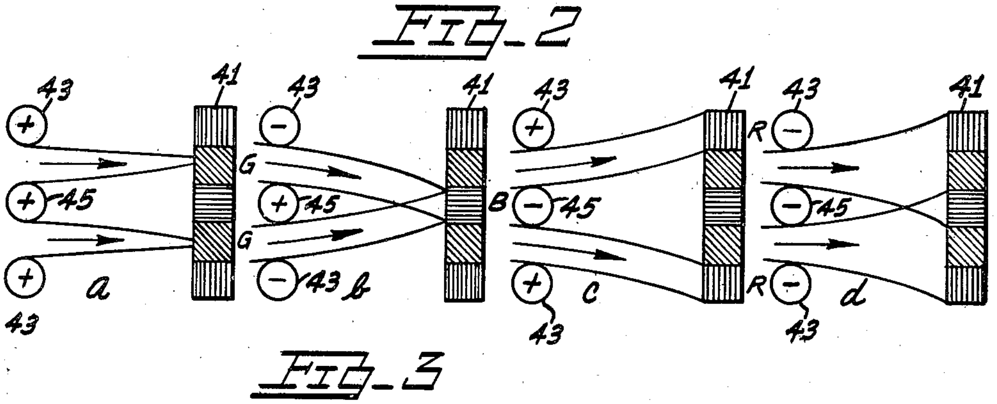
Figure 2 shows schematically by a greatly enlarged view a section of a suitable target screen and associated beam control arrangement suitable for employment in one form of this invention.

The structure and operation of the target assembly 31 may best be understood by reference to Figure 2, wherein there is shown by greatly enlarged cross-section one suitable type of target for employment in one form of this invention.

The target structure consists of a ruled color filter or color producing phosphor surface 41 consisting of alternate red, blue and green elements. The red, blue and green elements, as illustrated, are selectively positioned behind the conductors 43 and 45. Conductors 43 and 45 are, for example, separately connected to amplifiers 15 and 19, respectively.

It will be seen, by examination of each of the illustrations in Figure 2, that the electron beam indicated by arrows intercepts the filter 41 at locations dependent upon the relative potentials applied to conductors 43 and 45.

When both conductors 43 and 45 are positive, as illustrated in "*a*," the electron beam passes through the screen composed of conductors 43 and 45 to intercept the green elements of filter 41.

When, however, conductors 43 are relatively negative while conductor 45 is positive, the electron beam will tend to bend toward the relatively positive electrode 45 and strike the blue element of the filter 41. This condition is shown in "b" of Figure 2.

If conductors 43 are charged relatively positive while conductor 45 is charged relatively negative, the electron beam tends to diverge from conductor 41 to fall on the red elements of the filter 41 positioned immediately behind the conductors 43.

If, however, all conductors are charged relatively negative, the electron beam will tend to defocus and intersect all color elements of filter 41 to produce a white light.

If, in "b" of Figure 2, the incoming signals are such that there is very little difference in potential, the electrons of the beam will overlap both blue and green elements or segments to form a cyan color.

If, in "c" of Figure 2, there is very little difference in signal strength, the electrons will overlap red and green to form yellow.

If, in "d," the difference in potential is not great enough to cause complete separation, a purple color will be formed. It will therefore be seen that all shades may be reproduced.

It follows, therefore, that a colored image may be reproduced from the ratio signal trains applied to conductors 43 and 45.

Such a tube target arrangement is well shown and described in the co-pending U. S. application of Alfred C. Schroeder, entitled "Color Television Tubes," Serial No. 675,862, filed June 11, 1946, now Patent No. 3,446,791 granted August 10, 1948.

Figure 3:
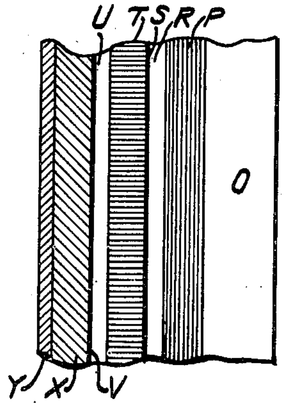
Figure 3 illustrates also in a schematic manner an enlargement of a small portion of another type target screen which is suitable for employment in another form of this invention.

Turning now to Figure 3, there is shown by greatly enlarged cross-section a portion of another suitable type cathode ray beam screen adapted to produce a color image. The color reproduced by the impact of the electron beam on the target area is dependent upon the relative potentials applied to its various electrical conductors. The screen structure consists of three different color phosphors superimposed.

The triple layer phosphor structure may be produced as follows. A transparent red phosphor P is deposited by spraying, settling evaporation, or other suitable manner on the glass face O of the kinescope, such as tube 25, of Figure 1. On top of this red phosphor P, a transparent barrier R may be deposited by evaporation. On top of the barrier R, a thin transparent conducting film or mesh S is deposited, and over that is sprayed or settled another layer of phosphor T which may, for example, be a blue phosphor.

This is followed by another barrier layer U, a transparent conducting layer V, and the third color phosphor X, which, in the example shown, provides a green fluorescence.

The whole screen structure, including the phosphors and conducting films or meshes, is finally backed up by a smooth metallic layer Y of approximately $10^{-5}$ cm. to reflect the light and still transmit electrons.

The operation of the complex screen is as follows. When the signals are of equal strength, the output of the ratio detectors is zero, and the barriers and phosphors are so diminished that the phosphors are excited equally to provide a white luminescence. If an all-green image portion is televised, ratio detectors 13 and 17 of Figure 1 provide a relatively negative potential to conductors S and V, thus restricting the electron penetration to the green phosphor. If a red image portion is being transmitted, both ratio detectors provide positive potentials to the conductors S and V, thus accelerating the beam through the green and blue phosphors X and T and reducing the collision probability and providing the red luminosity. Obviously, when conductor S is negative and V is positive, the beam will be accelerated through the green phosphor X, and decelerated in the blue phosphor T, and with not reach the red phosphor P, thus providing blue luminosity.

An image reproducing tube involving such a target screen arrangement is shown and described in the co-pending U. S. application of Vladymir K. Zworykin, entitled "Kinescope for Color Television Reception," Serial No. 739,503, filed April 4, 1947, and in my co-pending U. S. application, Serial No. 44,323, filed August 14, 1948, now Patent No. 2,566,713, granted September 4, 1951.

Figures 4, 5:
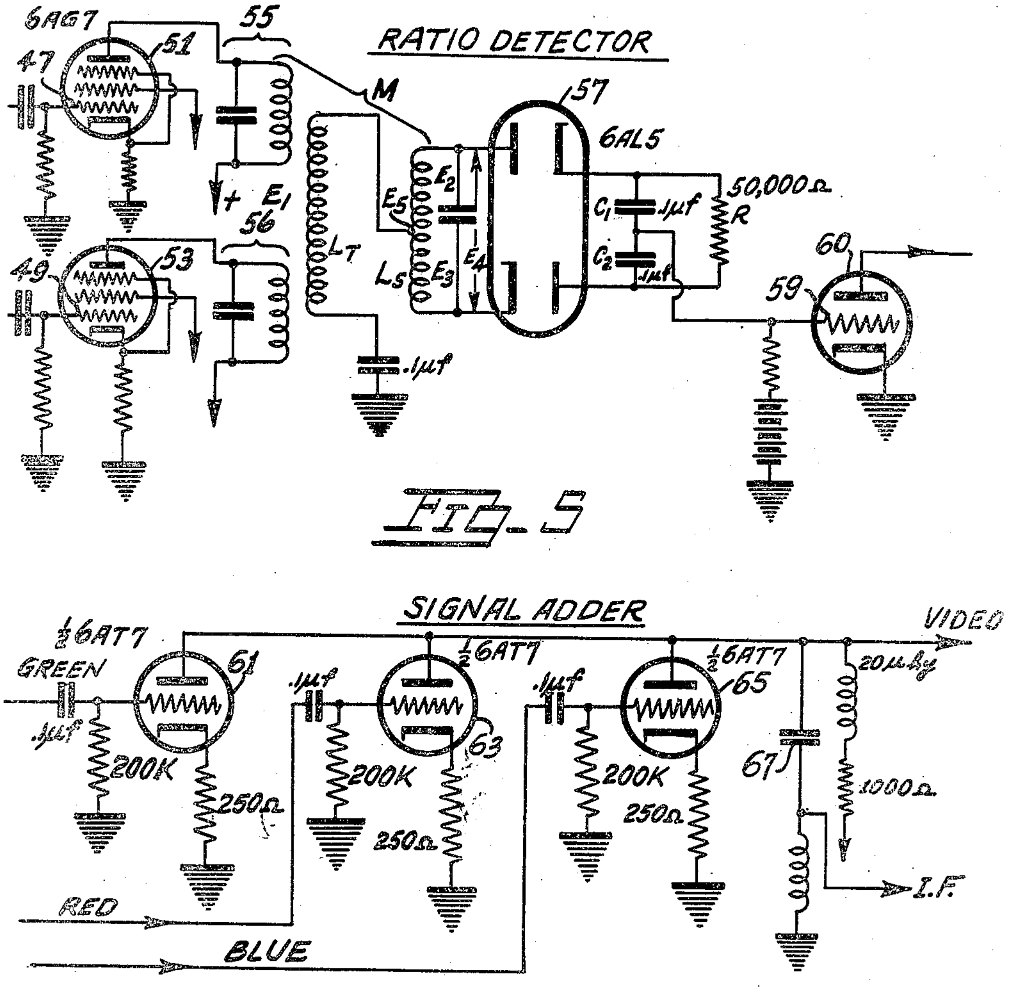
Figure 4 shows by circuit diagram a suitable signal ratio detector which may be employed in the practice of this invention in any of its forms.
Figure 5 shows by circuit diagram a signal adder which may be employed in the practice of this invention.

Turning now to Figure 4, there is shown by circuit diagram a ratio detector for employment in the practice of this invention.

The signal trains to be compared are applied to control electrodes 47 and 49 of tubes 51 and 53, respectively. The anodes of tubes 51 and 53 are each connected to oscillatory circuits 55 and 56 having different resonant frequencies. The resonant frequencies of oscillatory circuits 55 and 56 may, for example, correspond to the frequencies of the appropriately connected intermediate frequency amplifiers immediately preceding the ratio detector.

Circuits 55 and 56 are coupled to the double diode 57, which produces in an output circuit a signal train whose amplitude is equal to the ratio of the signal trains applied to control electrodes 47 and 49.

The principle underlying most circuits for frequency discrimination has been the peak rectification of two auxiliary voltages whose relative amplitudes are a function of frequency, together with means for combining the rectified voltages in reverse polarity.

In the requirement at hand, it is necessary to produce a voltage depending upon the ratio of the input signals whose frequency remains substantially constant.

Upon a brief examination of the circuit illustrated in Figure 4, it will become apparent that the energy furnished to the dual diode 57 at one frequency, such as, for example, the energy furnished in circuit 55, will influence the potential applied to control electrode 59 of tube 60 in one direction, while energy received from circuit 56 at a different frequency will influence the potential applied to control electrode 59 of tube 60 in the opposite direction. The potential applied to the control electrode 59 of tube 60 will therefore be dependent upon the energy ratio of the two intermediate frequency amplifier signal trains applied to tubes 51 and 53.

The theory of operation of discriminators and ratio detectors is quite well explained in the published writings concerning frequency modulation detection.

In view of the unusual employment of the ratio detector in the present invention, it is perhaps well to briefly outline the theory and operation of such circuit arrangements.

In order to improve the sensitivity of the circuit arrangement, a form of impedance matching is used between the high impedance of the driving pentodes 51 and 53 and the relatively low impedance of the dual diode and its associated circuit, which is of the order of several thousand ohms. This is, of course, the winding $L_T$, which is in practice wound over the cold end of the primary windings of the oscillatory circuits 55 and 56, and is tightly coupled to the primary coils. The phase of the voltages across the primary windings and $L_T$ is substantially the same. The voltages across $L_T$ and $L_S$ are in quadrature (at the center frequency).

The fact that the voltages across $L_T$ and $L_S$ are in quadrature we find in coupled-circuit theory.

Since each of the primary circuits 55 and 56 are tuned to resonance with their respective frequencies, their impedance may be considered to consist of a pure resistance. Hence, the voltage developed across each of the circuits 55 and 56 is in phase with their currents. Therefore, the voltages developed in circuits 55 and 56 are out of phase with the voltage developed in $L_S$ as a result of the mutual inductance between circuits 55, 56 and $L_S$.

The voltage in $L_S$ is made up of two equal voltages, $E_2$ and $E_3$, the sum of which may be designated $E_4$.

There is also introduced in coil $L_S$ a voltage $E_5$, which is equal in phase to the average of the voltages developed in circuits 55 and 56.

It follows, then, that voltage $E_5$ is out of phase with $E_4$. When the voltages developed in circuits 55 and 56 are equal, the phase difference between voltage $E_5$ and $E_4$ is equal to 90°. When, however, the voltage in circuit 55 is greater than the voltage in circuit 56, the phase relation between $E_5$ and $E_4$ changes from 90° to result in a change in voltage applied to control electrode 59 of tube 60. The direction of the change in voltage applied to control electrode 59 is therefore dependent upon the relative phase of voltages $E_5$ and $E_4$.

The operation of the ratio detector shown in Figure 4 may better be understood upon examination of its action under the influence of typical incoming signals.

If, for example, the circuit 56 is resonant to a frequency below the resonant frequency of the circuit including $L_S$, the circuit including $L_S$ becomes inductive and the voltage $E_4$ advances or leads the current. It can be seen that the vector addition of voltages $E_5$ and $E_3$ and of $E_5$ and $E_2$ no longer yield equal voltages. A resultant voltage change then appears in the output circuit.

The fact that the circuit 55 is tuned above the resonance frequency of the circuit including $L_S$ causes the circuit $L_S$ to become capacitive upon an application of the voltage from circuit 55. In this latter case, the voltage $E_4$ lags and the action is similar to that caused by voltage produced in circuit 56, except that the resultant output voltage changes in the opposite direction. Since these voltages are unlike, an output difference voltage will appear. The output voltage will therefore be produced by the ratio of the voltages developed in circuits 55 and 56.

The manner in which the ratio detector maintains a constant output independent of change in the sum of the incoming signal modulations may be explained as follows. If the amplitude of the combined input signal is constant, the stabilizing current, which we can assume normally flows through resistance R to charge condensers $C_1$ and $C_2$, is zero and the circuit has essentially the same output characteristic as a balanced discriminator. On the other hand, if the sum of the input signals increases, the diodes are driven harder, the average diode current increases, and the increased D.-C. current flows into the stabilizing voltage source to tend to charge condensers $C_1$ and $C_2$. If, however, the input signal decreases, the diode current decreases and the stabilizing voltage of the condensers makes up the decrease in diode current in order to maintain the same voltage across the two diode load resistors constant. Stabilizing the rectified voltage, therefore, results in the equivalent load resistance varying in such a way that it decreases when the sum of the input signals rises and increases when the sum of the input signals falls.

According to another form of this invention, a broad band limiter, together with any of the popular type discriminators, may be employed as the ratio detector. Several types of discriminators are shown and described, together with associated limiters, beginning on page 585 of the "Radio Engineers Handbook" by Terman, first edition.

Turning now to Figure 5, there is shown one form of signal adder which is suitable for employment as the signal adder 11 of Figure 1. The tubes 61, 63 and 65 are connected to have a parallel output with a separate and individual input.

The green signal is applied to the control electrode of 61, the red signal is applied to the control electrode of tube 63, while the blue signal is applied to the control electrode of tube 65. It will be seen that the video output signal obtained from the plates of tubes 61, 63 and 65 will therefore be the sum of the green, red and blue signals.

In other forms of this invention, the input signals to tubes 61, 63 and 65 may be at intermediate frequency or may have been already detected. Tubes 61, 63 and 65 may be biased for undistorted amplification or for detection. In the latter case, the output will contain both the I. F. and demodulated video component. Capacitor 67 bypasses the I. F., thus the top signal lead will provide the integrated video signal for the intensity control, while the bottom signal lead will have only the I. F. component. Since capacity 67 does not pass video frequencies, this will provide the total signal for the ratio detectors.

Turning now in more detail to Figure 6, there is shown one form of this invention suitable for the reception of signals which contain color information in the form of sum and ratio signals. A transmitter suitable for the transmission of such signals is shown in various forms in my copending U. S. application, Serial No. 788,746, filed November 28, 1947, now Patent No. 2,566,707, referred to above.

A suitable converter 71 and associated intermediate frequency amplifier 73 provide intermediate frequency amplifier 75 with a signal representative of the sum of the selected color components.

Intermediate frequency amplifier 73 also supplies a red ratio intermediate frequency amplifier 77 with a ratio signal representative of the ratio between the red selected component color and the sum of the selected component colors.

Intermediate frequency amplifier 73 also furnishes blue ratio intermediate frequency amplifier 79 with a ratio signal obtained at the transmitter circuit by comparing the blue component with the sum of the selected color components.

An overall intermediate frequency amplifier of the type suitable for employment in this form of the invention may be any of the well known forms or may take any of the forms shown and described in my co-pending U. S. application entitled "Signal Separator," Serial No. 760,400, filed July 11, 1947, and referred to above.

The signals amplified in intermediate frequency amplifiers 75, 77 and 79 are detected in detectors 81, 83 and 85 to be amplified in amplifiers 87, 89 and 91, respectively.

The amplified signals are then applied to tube 25 in the form shown and described in detail under Figure 1.

Turning now in detail to Figure 7, there is shown one form of this invention wherein the popular black and white television receiver 93 is employed for the reception and amplification of the total or sum signal received, for example, from the type of transmitter shown and described in my co-pending U. S. application, Serial No. 788,746, filed November 28, 1947, now Patent No. 2,566,707 and referred to above. The signal obtained from the black and white television receiver is applied to the color type kinescope 25 in the manner shown and described in detail in Figure 1 above.

In addition to the special color type kinescope 25, it is necessary, in the practice of this form of the invention, to employ a signal converter 95 adapted to receive a red ratio signal and a blue ratio signal from the transmitter.

The red ratio intermediate frequency is separated and amplified in red ratio intermediate frequency amplifier 97, while the blue ratio signal is separated and amplified in blue ratio intermediate frequency amplifier 99.

The red and the blue ratio signals are then detected in detectors 101 and 103, respectively, to be amplified in amplifiers 105 and 107.

The signals are then applied to the special color kinescope 25 in a manner similar to that outlined above in the description of the arrangement shown in Figure 1.

Although suitable tube types, resistance and capacity values are indicated on the drawing, they are shown merely for purposes of example, and it is not intended that this invention should be limited to the use thereof. Any suitable values and tube types may be employed without departing from the spirit of this invention.

Having thus described the invention, what is claimed is:

1. A color television system comprising in combination means for developing a first video signal train representative of one selected color component of an object being televised, means for developing a second video signal train representative of a second color component of said object being televised, a signal adder for combining said video signal trains, a signal ratio detector having an output circuit and a pair of input circuits, a connection between one of said pair of input circuits and one of said means for developing video signal trains, a connection between the other one of the pair of input circuits and the other of said means for developing video signal trains, an image producing tube having a beam intensity control electrode and a color selection control electrode, said beam intensity control electrode connected to said signal adder for combining said video signal trains, and said color selection control electrode connected to said output circuit of said signal ratio detector.

2. A color television receiving system comprising in combination means for developing a first video signal train representative of one selected color component of an object being televised from a television signal, means for developing a second video signal train representative of a second color component of said object being televised from said television signal, a signal adder for combining said video signal trains, a signal ratio detector having an output circuit and a pair of input circuits, a connection between one of said pair of input circuits and one of said means for developing video signal trains, a connection between the other one of the pair of input circuits and the other of said means for developing video signal trains, an image producing tube having a beam intensity control electrode and a color selection control electrode, said beam intensity control electrode connected to said signal adder, and said color selection control electrode connected to said output circuit of said signal ratio detector.

3. A color television system comprising means for dividing a video signal train into a component signal train for each of a plurality of selected color components of an object being televised, a signal adder for combining said video signal trains, a signal ratio detector having an output circuit and a pair of input circuits, a connection between one of said pair of input circuits and one of said means for dividing video signal trains, a connection between the other one of the pair of input circuits and another of said means for dividing video signal trains, an image producing tube having a beam intensity control electrode and a beam velocity control electrode, said beam intensity control electrode connected to said signal adder, and said beam velocity control electrode connected to said output circuit of said signal ratio detector.

4. A color television system comprising means for dividing a video signal train into a component signal train for each of a plurality of selected color components of an object being televised, a signal adder for combining said video signal trains, a signal ratio detector having an output circuit and a pair of input circuits, a connection between one of said pair of input circuits and one of said means for dividing video signal trains, a connection between the other one of the pair of input circuits and another of said means for dividing video signal trains, an image-producing tube having a beam intensity control electrode and a beam direction control electrode, said beam intensity control electrode connected to said signal adder, and said beam direction control electrode connected to said output circuit of said signal ratio detector.

5. A color television system comprising in combination means for separating from a television signal a first video signal train representative of one selected color component of an object being televised, means for separating from said television signal a second video signal train representative of a second color component of said object being televised, a signal adder for combining said video signal trains, a signal ratio detector having an output circuit and a pair of input circuits, a connection between one of said pair of input circuits and one of said means for developing video signal trains, a connection between the other one of the pair of input circuits and the other of said means for developing video signal trains, an image producing tube having a beam intensity control electrode and color selection control electrodes, said beam intensity control electrode connected to said signal adder, and said color selection control electrodes connected to said output circuit of said signal ratio detector.

6. A color television system comprising means for developing a video signal train for each of a plurality of selected color components of a television signal wave, a signal adder for combining said video signal trains, a signal ratio detector having an output circuit and a pair of input circuits, a connection between one of said pair of input circuits and one of said means for developing video signal trains, a connection between the other one of the pair of input circuits and another of said means for developing video signal trains, an image producing tube having a beam intensity control electrode, and a color selection control electrode, said beam intensity control electrode connected to said signal adder, and said color selection control electrode connected to said output circuit of said signal ratio detector.

7. A color television system comprising in combination means for developing from a color television wave a first video signal train representative of one selected color component of an object being televised, means for developing from said color television wave a second video signal train representative of a second color component of said object being televised, means for developing from said color television wave a third video signal train representative of a third color component of said object being televised, a signal added for combining said video signal trains, a connection between said signal adder and said means for developing video signal trains, a signal ratio detector having an output circuit and a pair of input circuits, a connection between one of said pair of input circuits and said means for developing a first video signal train, a connection between the other one of the pair of input circuits and said signal adder, a second signal ratio detector having an output circuit and a pair of input circuits, a connection between one of said pair of input circuits of said second signal ratio detector and said means for developing a second video signal train, a connection between the other one of the pair of input circuits of said second signal ratio detector and said signal adder, an image producing tube having a beam intensity control electrode and a pair of color selection control electrodes, said beam intensity control electrode connected to said signal adder, and one different of said color selection control electrodes connected to each of said signal ratio detectors.

8. A color television system comprising in combination means for developing from a color television wave a first video signal train representative of one selected color component of an object being televised, means for developing from said color television wave a second video signal train representative of a second color component of said object being televised, means for developing from said color television wave a third video signal train representative of a third color component of said object being televised, a signal adder for combining said video signal trains, a connection between said signal adder and said means for developing video signal trains, a signal ratio detector having an output circuit and a pair of input circuits, a connection between one of said pair of input circuits and said means for developing a first video signal train, a connection between the other one of the pair of input circuits and said means for developing a second video signal train, a second signal ratio detector having an output circuit and a pair of input circuits, a connection between one of said pair of input circuits of said second signal ratio detector and said means for developing a second video signal train, a connection between the other one of the pair of input circuits of said second signal ratio detector and said means for developing a third video signal train, an image producing tube having a beam intensity control electrode and a pair of color selection control electrodes, said beam intensity control electrode connected to said signal adder, and one different of said color selection control electrodes connected to each of said signal ratio detectors.

9. A color television system comprising in combination means for developing from a color television wave a first video signal train representative of one selected color component of an object being televised, means for developing from said color television wave a second video signal train representative of a second color component of said object being televised, means for developing from said color television wave a third video signal train representative of a third color component of said object being televised, a signal adder for combining said video signal trains, a connection between said signal adder and said means for developing video signal trains, a signal ratio detector having an output circuit and a pair of input circuits, a connection between one of said pair of input circuits and said means for developing a first video signal train, a connection between the other one of the pair of input circuits and said means for developing a third video signal train, a second signal ratio detector having an output circuit and a pair of input circuits, a connection between one of said pair of input circuits of said second signal ratio detector and said means for developing a second video signal train, a connection between the other one of the pair of input circuits of said second signal ratio detector and said means for developing a third video signal train, an image producing tube having a beam intensity control electrode and beam velocity control electrodes, a connection between said beam intensity control electrode and said signal adder, and a connection between a different beam velocity control electrode and each of said signal ratio detectors.

10. A color television system comprising in combination means for developing from a color television wave a first video signal train representative of one selected color component of an object being televised, means for developing from said color television wave a second video signal train representative of a second color component of said object being televised, means for developing from said color television wave a third video signal train representative of a third color component of said object being televised, a signal adder for combining said video signal trains, a connection between said signal adder and said means for developing video signal trains, a signal ratio detector having an output circuit and a pair of input circuits, a connection between one of said pair of input circuits and said means for developing a first video signal train, a connection between the other one of the pair of input circuits and said means for developing a second video signal train, a second signal ratio detector having an output circuit and a pair of input circuits, a connection between one of said pair of input circuits of said second signal ratio detector and said means for developing a first video signal train, and a connection between the other one of the pair of input circuits of said second signal ratio detector and said means for developing a third video signal train, an image producing tube having a beam intensity control electrode and beam bending electrodes, a connection between said beam intensity control electrode and said signal adder, and a connection between a different beam bending electrode and each of said signal ratio detectors.

11. In a television system wherein images are developed with an electron scanning beam from individual signal trains representative respectively of the image color information, apparatus for the reproduction of images in substantially their natural colors comprising, means for adding said individual signal trains to form a composite signal train, means responsive to said signal trains for developing a ratio signal train representative of the ratio between said individual signal trains, means responsive to said composite signal train for controlling the intensity of said scanning beam, and means responsive to said ratio signal train for controlling the color-selecting operation of said scanning beam to reproduce said image.

12. In a television system wherein images are developed with an electron scanning beam from individual signal trains representative respectively of different selected image color components, apparatus for the reproduction of images in substantialy their natural colors comprising, means for adding said individual signal trains to form a composite signal train, means responsive to said individual signal trains and to said composite signal train for developing a ratio signal train representative of the ratio between said individual signal trains, means responsive to said composite signal train for controlling the intensity of said scanning beam, and means responsive to said ratio signal trains for controlling the velocity of electrons in said scanning beam.

13. In a television system wherein images are developed with an electron scanning beam from individual signal trains representative respectively of all of the different selected image color components, apparatus for the reproduction of images in substantially their natural colors comprising, means for adding said individual signal trains to form a composite signal train, means responsive to said individual signal trains and to said composite signal train for developing a ratio signal train representative of the ratio between predetermined ones of said individual signal trains, means responsive to said composite signal train for controlling the intensity of said scanning beam, and means responsive to said ratio signal trains for controlling the path of said electron scanning beam.

14. In a television system wherein images are developed with an electron scanning beam from individual signal trains representative respectively of all the different selected image color components, apparatus for the reproduction of images in substantially their natural colors comprising, means for adding said individual signal trains to form a composite signal train, means responsive to said individual signal trains and to said composite signal train for developing a plurality of ratio signal trains representative of the ratios between predetermined ones of said individual signal trains, means responsive to said composite signal train for controlling the intensity of said scanning beam, and means responsive to said ratio signal trains for controlling the color-selecting operation of said scanning beam.

15. In a television system wherein images are developed with an electron scanning beam from individual signal trains representative of selected image color components, apparatus for the reproduction of images in substantially their natural colors comprising, means for adding said individual signal trains together to form a composite signal train, means including ratio detector apparatus for developing ratio signal trains corresponding to ratios between said individual signal trains, means for controlling the intensity of said scanning beam in accordance with said composite signal train, and means for controlling said electron scanning beam for color selection in accordance with said ratio signal trains.

16. In a television system wherein images are developed with an electron scanning beam from individual signal trains representative respectively of the red, blue and green color component images of an image, apparatus for the reproduction of images in substantially their natural color comprising, means for adding said individual signal trains to form a composite signal train, means responsive to said red-representative individual signal trains and also to said composite signal train for developing a ratio signal train representative of the ratio between said red-representative individual signal train and said composite signal train, means responsive to said blue-representative individual signal train and also to said composite signal train for developing a ratio signal train representative of the ratio between said blue-representative individual signal train and said composite signal train, means for controlling the intensity of said scanning beam with said composite signal train, and means for controlling the color-selecting operation of said electron scanning beam with said ratio signal trains.

17. In a television system wherein images are developed with an electron scanning beam from individual signal trains representative respectively of the red, blue and green component colors of an image, apparatus for the reproduction of images in substantially their natural color comprising, means for adding said individual signal trains to form a composite signal train, means responsive to said blue- and red-representative individual signal trains for developing a ratio signal train representative of the ratio between said blue- and red-representative individual signal trains, means responsive to said red- and green-representative individual signal trains for developing a ratio signal train representative of the ratio between said red- and green-representative individual signal trains, means responsive to said composite signal train for controlling the intensity of said scanning beam, and means responsive to said ratio signal trains for controlling the color-selecting operation of said scanning beam.

18. In a television system wherein images are developed with an electron scanning beam from individual signal trains representative respectively of the red, blue and green component colors of an image, apparatus for the reproduction of images in substantially their natural color comprising, means for adding said individual signal trains to form a composite signal train, means responsive to said blue- and red-representative individual signal trains for developing a ratio signal train representative of the ratio between said blue- and red-representative individual signal trains, means responsive to said blue- and green-representative individual signal trains for developing another ratio signal train representative of the ratio between said blue- and green-representative individual signal trains, means responsive to said composite signal train for controlling the intensity of said scanning beam, and means responsive to said ratio signal trains for controlling the color-selecting operation of said scanning beam.

19. In a television system wherein images are developed with an electron scanning beam from individual signal trains representative respectively of the red, blue and green color components of an image, apparatus for the reproduction of images in substantially their natural color comprising, means for adding said separate signal trains to form a composite signal train, means responsive to said blue- and green-representative individual signal trains for developing a first ratio signal train representative of the ratio between said blue- and green-representative individual signal trains, means responsive to said red- and green-representative individual signal trains for developing a second ratio signal train representative of the ratio between said red- and green-representative individual signal trains, means responsive to said composite signal train for controlling the intensity of said scanning beam, and means responsive to said ratio signal trains for controlling the color-selecting operation of said scanning beam.

GEORGE C. SZIKLAI.

REFERENCES CITED

The following references are of record in the file of this patent:

UNITED STATES PATENTS

| Number | Name | Date |
|---|---|---|
| 2,335,180 | Goldsmith | Nov. 23, 1943 |
| 2,375,966 | Valensi | May 15, 1945 |
| 2,423,769 | Goldsmith | July 8, 1947 |
| 2,446,249 | Schroeder | Aug. 3, 1948 |
| 2,455,710 | Szegho | Dec. 7, 1948 |
| 2,461,515 | Bronwell | Feb. 15, 1949 |

FOREIGN PATENTS

| Number | Country | Date |
|---|---|---|
| 505,653 | Great Britain | May 11, 1939 |